United States Patent
Karunanithi et al.

(10) Patent No.: US 11,563,692 B2
(45) Date of Patent: Jan. 24, 2023

(54) COMMUNICATION METHODS, APPARATUSES AND SYSTEM FOR SHARING NETWORK RESOURCES

(71) Applicant: Huawei Technologies Co., Ltd., Shenzhen (CN)

(72) Inventors: Satish Karunanithi, Bangalore (IN); Dhruv Dhody, Bangalore (IN); Shankara Devadiga, Bangalore (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 16/898,570

(22) Filed: Jun. 11, 2020

(65) Prior Publication Data
US 2020/0304419 A1    Sep. 24, 2020

Related U.S. Application Data

(63) Continuation of application No. PCT/CN2018/119847, filed on Dec. 7, 2018.

(30) Foreign Application Priority Data

Dec. 13, 2017    (IN) .......................... IN201731044887

(51) Int. Cl.
*H04L 12/913* (2013.01)
*H04L 12/723* (2013.01)
(Continued)

(52) U.S. Cl.
CPC ............ *H04L 47/724* (2013.01); *H04L 45/50* (2013.01)

(58) Field of Classification Search
CPC .............................. H04L 47/724; H04L 45/50
See application file for complete search history.

(56) References Cited

U.S. PATENT DOCUMENTS

| 7,496,105 B2 | 2/2009 | Vasseur et al. |
| 7,710,872 B2 | 5/2010 | Vasseur |

(Continued)

FOREIGN PATENT DOCUMENTS

| CN | 101753427 A | 6/2010 |
| CN | 102055612 A | 5/2011 |

(Continued)

OTHER PUBLICATIONS

Zhang, X., et al., "Extensions to Path Computation Element Protocol (PCEP) to Support Resource Sharing-based Path Computation," draft-zhang-pce-resource-sharing-01.txt, PCE Working Group Internet Draft, Jul. 3, 2014, 13 pages.

(Continued)

*Primary Examiner* — Luat Phung
(74) *Attorney, Agent, or Firm* — Conley Rose, P.C.

(57) ABSTRACT

A communications method enables a path computation element (PCE) to notify path computation clients (PCCs) about the shared resources of independent label switch paths by allowing a PCE to send an association object with a new association type to PCC. A PCE Communication Protocol extension that associates label-switched paths (LSPs) whose ingress, or egress, or both ingress and egress are different for resource sharing to avoid path computation failures or duplicate allocation of resources during common links for new LSPs created during an update of end-to-end (E2E) LSP. The PCC employs Resource Reservation Protocol (RSVP) for LSP signalling, PCC forwards path message information along with association object to the RSVP for LSP signalling. The RSVP uses the association object in its reservation message for LSP setup.

27 Claims, 8 Drawing Sheets

(51) Int. Cl.
*H04L 47/724* (2022.01)
*H04L 45/50* (2022.01)

(56) References Cited

U.S. PATENT DOCUMENTS

| | | | |
|---|---|---|---|
| 2012/0008632 A1 | 1/2012 | Liu et al. | |
| 2013/0058324 A1* | 3/2013 | Zhang | H04L 47/00 370/351 |
| 2015/0103844 A1* | 4/2015 | Zhao | H04L 45/028 370/410 |
| 2016/0006614 A1* | 1/2016 | Zhao | H04L 45/64 370/254 |
| 2016/0212179 A1* | 7/2016 | Kern | H04L 45/44 |
| 2016/0261494 A1* | 9/2016 | Dai | H04L 45/128 |
| 2018/0309667 A1 | 10/2018 | Che et al. | |

FOREIGN PATENT DOCUMENTS

| | | |
|---|---|---|
| CN | 102971994 A | 3/2013 |
| CN | 106936713 A | 7/2017 |
| EP | 3065357 A1 | 9/2016 |
| WO | 2016124228 A1 | 8/2016 |
| WO | 2017005157 A1 | 1/2017 |
| WO | 2017121247 A1 | 7/2017 |
| WO | 2017143958 A1 | 8/2017 |
| WO | 2017190573 A1 | 11/2017 |

OTHER PUBLICATIONS

Minei, I., et al., "PCEP Extensions for establishing relationships between sets of LSPs," draft minei-pce-association-group-00, PCE Working Group Internet—Draft, Jun. 27, 2014, 8 pages.

Zhang, F., Ed., "RSVP-TE Extensions for Associated Bidirectional LSPs," draft-ietf-ccamp-mpls-tp-rsvpte-ext-associated-lsp-05, Sep. 13, 2012, 15 pages.

Dhody, D., et al., "Applicability of Path Computation Element (PCE) for Abstraction and Control of TE Networks (ACTN)," draft-ietf-pce-applicability-actn-01, Jun. 29, 2017, 18 pages.

Minei, I., et al., "PCEP Extensions for establishing relationships between sets of LSPs," draft-ietf-pce-association-group-00, Nov. 26, 2015, 13 pages.

Minei, I., "PCEP Extensions for Establishing Relationships Between Sets of LSPs," draft-minei-pce-association-group-03, 41 pages.

Crabbe, E., "PCEP Extensions for PCE-initiated LSP Setup in a Stateful PCE Model," draft-ietf-pce-pce-initiated-isp-07, Jul. 18, 2016, 54 pages.

Crabbe, E., et al., "PCEP Extensions for Stateful PCE," draft-ietf-pce-stateful-pce-21, Jun. 19, 2017, 54 pages.

Lee, Y., et al., "Framework for Abstraction and Control of Traffic Engineered Networks," draft-ietf-teas-actn-framework-05, May 5, 2017, 41 pages.

Ceccarelli, D., Ed., et al., "Framework for Abstraction and Control of Traffic Engineered Networks," draft-ietf-teas-actn-framework-06, Jun. 13, 2017, 41 pages.

Zhang, X., et al., "Extensions to Path Computation Element Protocol (PCEP) to Support Resource Sharing-based Path Computation," draft-zhang-pce-resource-sharing-03.txt, Feb. 27, 2015, 14 pages.

Vasseur, JP., Ed., et al, "Path Computation Element (PCE) Communication Protocol (PCEP)," RCE 5440, Mar. 2009, 87 pages.

Zhang, F., Ed., "RSVP-TE Extensions for Associated Bidirectional Label Switched Paths (LSPs)," RFC 7551, May 2015, 20 pages.

Lang, J., et al., "Generalized MPLS Recovery Mechanisms," draft-lang-ccamp-recovery- 01.txt, No. 1, Jul. 1, 2001, XP015031359, 14 pages.

Berger, L., et al., "Usage of The RSVP Association Object," draft-ietf-ccamp-assoc-info-01.txt, Mar. 14, 2011, pp. 1-23, XP015074756.

Tanaka, Y., et al., "Make-Before-Break MPLS-TE LSP restoration and reoptimization procedure using Stateful PCE," draft-tanaka-pce-stateful-pce-mbb-04.txt. No. 4, Jun. 28, 2017, pp. 1-17, XP015120382.

Qiu Zaimeng, "Research of Pce-Based Routing Technology and Resources Assignment in Intelligent Optical Netwrors," Beijing University of Posts and Telecommunications, 2015, Issue 04, 2 pages (abstract).

Jawwad Ahmed et al, "Bulk provisioning of LSP requests with shared path protection in a PCE based WDM network," 2011, 6 pages.

\* cited by examiner

The IPv4 ASSOCIATION object (Class-Num of the form 11bbbbbb with value = 199, C-Type = 1) has the format:

The IPv6 ASSOCIATION object (Class-Num of the form 11bbbbbb with value = 199, C-Type = 2) has the format:

COMMUNICATION METHODS, APPARATUSES AND SYSTEM FOR SHARING NETWORK RESOURCES

CROSS-REFERENCE TO RELATED APPLICATIONS

This application is a continuation of International Patent Application No. PCT/CN2018/119847, filed on Dec. 7, 2018, which claims priority to Indian Patent Application No. IN201731044887, filed on Dec. 13, 2017. The disclosures of the aforementioned applications are hereby incorporated by reference in their entireties.

TECHNICAL FIELD

The present subject matter described herein, in general, relates to traffic engineered networks. More particularly, it relates to a mechanism for a path computation element (PCE) to notify path computation client(s) (PCCs) about shared resources of independent label switch paths.

BACKGROUND

Abstraction of network resources is a technique that can be applied to a single network domain or across multiple domains to create a single virtualized network that is under the control of a network operator or the customer of the operator that actually owns the network resources.

Abstraction and Control of Traffic Engineered Networks (ACTN) refers to the set of virtual network operations needed to orchestrate, control and manage large-scale multi-domain TE networks thereby facilitating network programmability, automation, efficient resource sharing, and end-to-end (E2E) virtual service aware connectivity and network function virtualization (NFV) services. The ACTN facilitates virtual network operation via the creation of a single virtualized network or a seamless service.

PCE Communication Protocol (PCEP) facilitates communication between a PCC and a PCE, or between PCE and PCE, for the purpose of computation of Multiprotocol Label Switching (MPLS) for traffic engineering label-switched path (TE LSP) characteristics. Thus, the PCEP provides mechanisms for PCEs to perform path computations in response to PCCs requests. While the PCEP explicitly makes no assumptions regarding the information available to a PCE, it also makes no provisions for the PCE to control timing and sequence of path computations within and across PCEP sessions.

Significantly, the PCE is a network entity capable of computing a network path or route based on a network graph, and of applying computational constraints during the computation. The PCE entity is located within a network node or component, on an out-of-network server, etc. For example, a PCE would be able to compute the path of a TE LSP by operating on the traffic engineering database (TED) and considering bandwidth and other constraints applicable to the TE LSP service request.

The PCC is also a network entity which can be any client application that is requesting a path computation to be performed by the PCE. A PCC can have PCEP sessions with more than one PCE, and similarly a PCE may have PCEP sessions with a plurality of PCCs.

Implementing ACTN using PCE and PCEP. A hierarchical PCE architecture is the key to ACTN framework, where in the domain controllers (or Physical Network Controller (PNC)) have the control only to its specific domain and the super controller has the global view of all the domains and can compute and setup end to end multi-domain and multi-layer path.

The Multi-Domain Service Coordinator (MDSC) is a functional block that implements the main ACTN functions such as multi-domain coordination, virtualization/abstraction, customer mapping/translation, and virtual service coordination. The MDSC co-ordinates with domain controllers to compute E2E path and MDSC further breaks the path into per-domain LSP segments. Domain controllers of corresponding LSP segment further initiate the path setup process with in its domain.

Figure 1A:
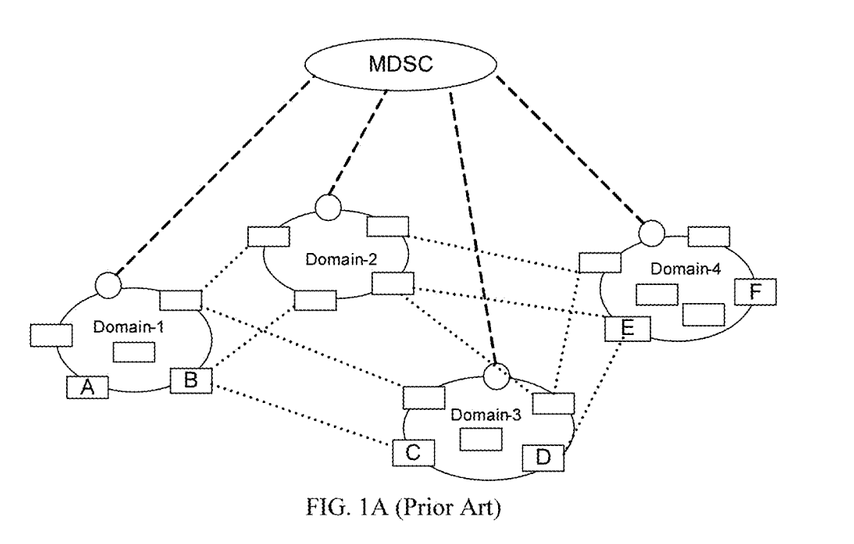
FIG. 1A illustrates the objective technical problem of the present disclosure.

Significantly, in ACTN architecture, the MDSC has complete/abstract topology information of the complete network, and is therefore capable of computing E2E with the requisite constraints. The MDSC breaks an E2E path into per-domain LSP segments and requests the corresponding domain controller of the domain to provision this LSP in the network, as illustrated in FIG. 1. The MDSC employs PCEP protocol for communication with PNC's (who are the domain controllers). When all domain LSP's are up then the MDSC stitches a multi-domain path.

FIG. 1A illustrates an end-to end path computation, requested at the MDSC via the domain controllers, as other approaches. The MDSC then computes an end to end path (A to F) either by itself or by employing a child PCE. The MDSC further breaks the path into per-domain LSP segments.

Figure 1B:
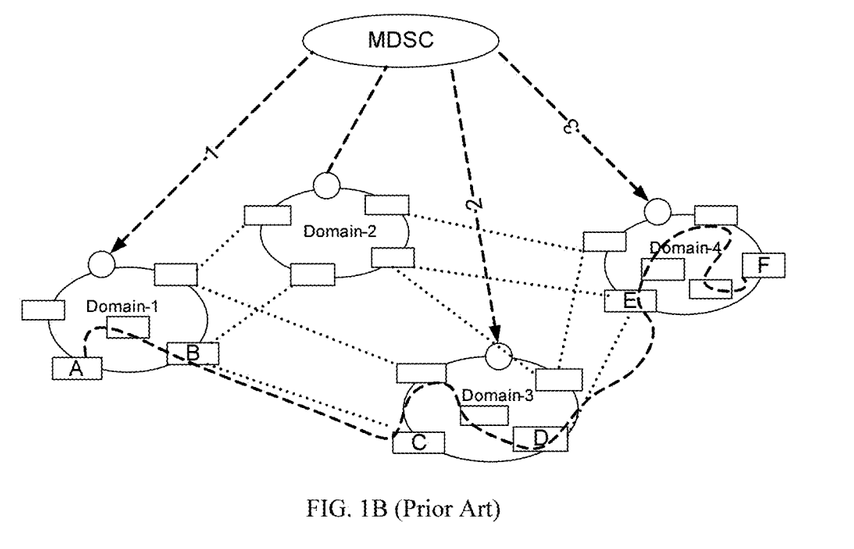
FIG. 1B also illustrates the objective technical problem of the present disclosure.

In the scenario illustrated in FIG. 1B, in step 1, the MDSC sends a Path Computation initiate (PCInitiate) message, for LSP A to C, to Domain 1. In step 2, the MDSC sends the PCInitiate message, for LSP C to E, to Domain 3. In step 3, the MDSC sends the PCInitiate, for LSP E to F, to Domain 4.

Figure 1C:
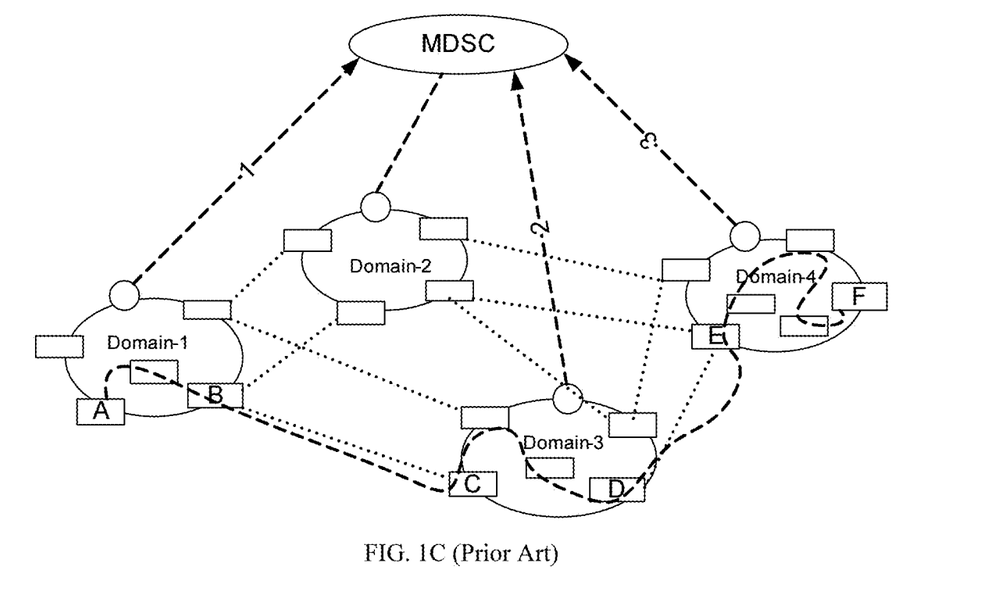
FIG. 1C also illustrates the objective technical problem of the present disclosure.

In the scenario illustrated in FIG. 1C, in step 1, the PNC sends a path computation state report (PCRpt) message for LSP A to C to the MDSC. In step 2, the PNC sends a PCRpt message for LSP C to E to the MDSC. In step 3, the PNC sends a PCRpt message for LSP E to F to the MDSC. Notably, once the MDSC (also known as Parent PCE) receives up-state from each LSP segment, it stitches the per-domain LSP.

In the Hierarchical solution of E2E multi-domain LSP, there exists a need for LSP update at MDSC that can lead to the following domain LSP update at PNC (or domain controller)

New LSP with same ingress and different egress with respect to old LSP.

New LSP with different ingress and same egress with respect to old LSP.

New LSP with different ingress and different egress with respect to old LSP.

New LSP with same ingress and same egress with respect to old LSP.

In all the above case, if there is common link between old the LSP and updated/new LSP, then the resource of this common link must be shared between these LSP's. If the resource of the common link is not shared between the LSP's, then the domain PCE path computation may fail owing to resource shortage or duplication of resource allocation in the common link.

Figure 2:
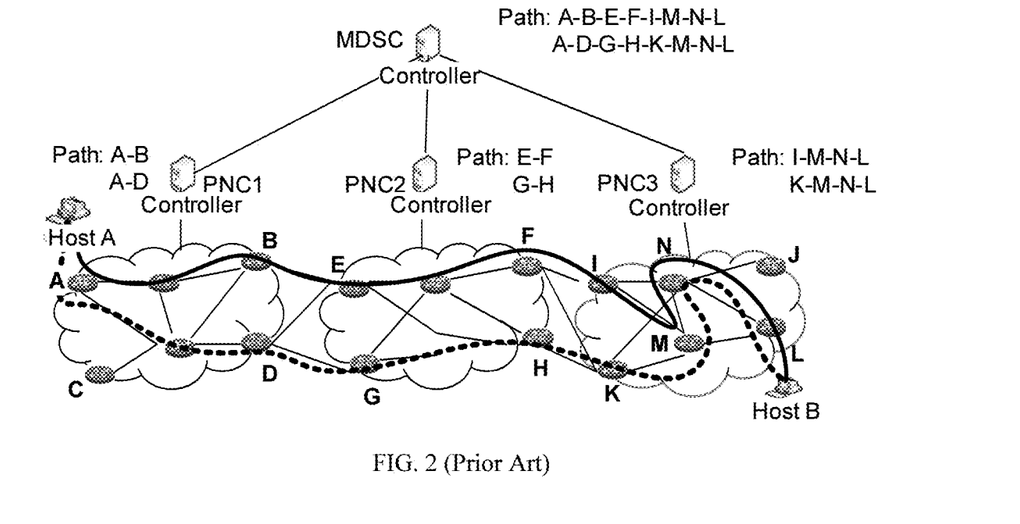
FIG. 2 illustrates a reference technical solution to the objective technical problem of the present disclosure.

FIG. 2 illustrates an example where the master controller MDSC computes a path between A to L. The PNC's or the domain controller's setup the paths A-B, E-F and I-L respectively, LSP1. During path update, the MDSC re-computes the E2E path between A to L, based on new constraints similar to -make before break (MBB) for LSP1 in MDSC. To update this LSP1 MDSC breaks this E2E LSP to domain specific Update/Delete/Create Domain specific LSP.

In particular, after the MDSC computes a path between A to L which is LSP1 (represented by solid line in FIG. 2), the PNC1 sets up a path from A-B, while PNC2 sets up a path from E-F and PNC3 sets up a path from I-L. At the time of global optimization/path update case, the MDSC re-computes the E2E path between A to L, based on a new constraint. This scenario is similar to MBB for LSP1 in MDSC. In order to update this LSP1, the MDSC breaks the E2E LSP (i.e., LSP1) to domain specific Update/Delete/Create Domain specific LSP. For the new LSP, i.e., LSP2 (represented by dotted line), for the Master controller it is an MBB for LSP1.

When a new LSP is being created, for the MDSC, it is an MBB for LSP1. However, for the PNC's or domain controllers, it is as follows.

PNC1—Create new LSP A-D and delete LSP A-B. Significantly, resources are not shared in this case as this is not an update operation and also because the source/destination of the two LSP's are not same.

PNC2—Create new LSP G-H and delete LSP E-F. Resources are not shared in this case as well as this is not an update operation and also because the source/destination of the two LSP's are not same.

PNC3—Create new LSP K-L and delete LSP I-L. Significantly, when creating the new LSP K-L, there is a shared link between these two LSP's that is M-N and N-L links. If the resources are not shared between these two LSP's on these links will cause issues due to incorrect allocation.

Accordingly, the domain controller path computation may fail or duplicate allocations may occur as shared resources are not considered in common links (involving the hosts M-N, N-L).

Thus, the technical problem faced the state of art technologies is that domain controller path computation fail or produce duplicate allocations since sharing of resources is not considered in common links for new LSP's created during an update of E2E LSP. In particular, they do not specify any mechanism to share the resources of two independent LSP's where either the ingress, or the egress, or both ingress and egress are different among the LSP's.

Accordingly, the objective technical problem solved by the present disclosure is how to share network resources of two independent LSP's where either ingress, or egress, or both ingress and egress are different among the two LSP's.

SUMMARY

The objective of the present disclosure is to provide a mechanism for a PCE to notify a PCC about shared resource of two independent LSP's by allowing a PCE to send an association object with a new association type to PCC. In particular, the present disclosure provides a PCEP extension for associating LSP's whose ingress, or egress, or both ingress and egress are different for resource sharing to avoid path computation failures or duplicate allocations during common links for new LSP's created during an update of E2E LSP. The PCC employs Resource Reservation Protocol (RSVP) for LSP signalling, PCC forwards path message information along with association object to the RSVP for LSP signalling. The RSVP uses the association object in its reservation message for LSP setup.

According to first aspect of the disclosure, there is provided a communication method for sharing network resources, said method comprising the steps of receiving, by a first network apparatus, a first packet from a second network apparatus, wherein the first packet comprises an association object and path information, determining, by the first network apparatus, a first label switched path according to the association object, and creating, by the first network apparatus, a second label switched path according to the path information, wherein the second label switched path shares network resources allocated to the first label switched path with the first label switched path.

In a first possible implementation of the method according to the first aspect, the method prior to the receiving of the first packet comprises the steps of receiving, by the first network apparatus, a second packet from the second network apparatus, wherein the second packet comprises the association object and an identifier indicating the first label switched path, wherein the second packet indicates that the first label switched path is associated with the association object. Based on the second packet, the first network apparatus can obtain a relationship between the association object and the identifier, then after receiving the first packet, it can obtain the identifier based on the association object in the first packet and the relationship.

In a second possible implementation of the method according to the first aspect, the first label switched path and the second label switched path have different ingress nodes or egress nodes.

In a third possible implementation of the method according to the first aspect, the second packet is a path computation update (PCUpd) message or a PCRpt message.

In a fourth possible implementation of the method according to the first aspect, the first packet is a PCInitiate message.

In a fifth possible implementation of the method according to the first aspect, the association object comprises an association type indicating resource sharing.

According to second aspect of the disclosure, there is provided a communication method for sharing network resources, said method comprising the steps of sending, by a second network apparatus, a first packet comprising an association object and path information to a first network apparatus, wherein the first packet instructs the first network apparatus to determine a first label switched path according to the association object and create a second label switched path according to the path information, wherein the second label switched path shares network resources allocated to the first label switched path with the first label switched path.

In a first possible implementation of the communication method according to the second aspect, prior to the sending of the first packet, said method comprises the steps of sending, by the second network apparatus, a second packet to the first network apparatus, wherein the second packet comprises the association object and an identifier indicating the first label switched path, wherein the second packet indicates that the first label switched path is associated with the association object.

In a second possible implementation of the communication method according to the second aspect, the first label switched path and the second label switched path have different ingress nodes or egress nodes.

In a third possible implementation of the communication method according to the second aspect, the second packet is a PCUpd message or a PCRpt message.

In a fourth possible implementation of the communication method according to the second aspect, the first packet is a PCInitiate message.

In a fifth possible implementation of the communication method according to the second aspect, the association object comprises an association type indicating resource sharing.

According to third aspect of the disclosure, there is provided a first network apparatus for sharing network resources comprising a transceiver unit and a processing unit. The transceiver unit configured to receive a first packet comprising an association object and path information, and the processing unit configured to determine a first label switched path according to the association object, and create a second label switched path according to the path information, wherein the second label switched path shares network resources allocated to the first label switched path with the first label switched path.

In a first possible implementation of the first network apparatus according to the third aspect, the transceiver unit is configured to receive a second packet before receiving the first packet, wherein the second packet comprises the association object and an identifier indicating the first label switched path, wherein the second packet indicates that the first label switched path is associated with the association object.

In a second possible implementation of the first network apparatus according to the third aspect, the first label switched path and the second label switched path have different ingress nodes or egress nodes.

In a third possible implementation of the first network apparatus according to the third aspect, the second packet is a PCUpd message or a PCRpt message.

In a fourth possible implementation of the first network apparatus according to the third aspect, the first packet is a PCInitiate message.

In a fifth possible implementation of the first network apparatus according to the third aspect, the association object comprises an association type indicating resource sharing.

According to fourth aspect of the disclosure, there is provided second network apparatus for sharing network resources comprising a transceiver unit configured to send a first packet comprising an association object and path information, wherein the first packet instructs the first network apparatus to determine a first label switched path according to the association object and create a second label switched path according to the path information, wherein the second label switched path shares network resources allocated to the first label switched path with the first label switched path.

In a first possible implementation of the second network apparatus according to the fourth aspect, the transceiver unit is configured to send a second packet before sending the first packet, wherein the second packet comprises the association object and an identifier indicating the first label switched path, wherein the second packet indicates that the first label switched path is associated with the association object.

In a second possible implementation of the second network apparatus according to the fourth aspect, the first label switched path and the second label switched path have different ingress nodes or egress nodes.

In a third possible implementation of the second network apparatus according to the fourth aspect, the second packet is a PCUpd message or a PCRpt message.

In a fourth possible implementation of the second network apparatus according to the fourth aspect, the first packet is a PCInitiate message.

In a fifth possible implementation of the second network apparatus according to the fourth aspect, the association object comprises an association type indicating resource sharing.

According to fifth aspect of the disclosure, there is provided communication system for sharing network resources comprising a first network apparatus and a second network apparatus. The first network apparatus comprises a first transceiver unit configured to receive a first packet comprising an association object and path information, and a processing unit configured to determine a first label switched path according to the association object, and create a second label switched path according to the path information, wherein the second label switched path shares network resources allocated to the first label switched path with the first label switched path. The second network apparatus comprises a second transceiver unit configured to send the first packet.

In a first possible implementation of the system according to the fifth aspect, the first transceiver unit is configured to receive a second packet before receiving the first packet, wherein the second packet comprises the association object and an identifier indicating the first label switched path, wherein the second packet indicates that the first label switched path is associated with the association object.

It is to be understood that the attached drawings are for purposes of illustrating the concepts of the disclosure and may not be to scale.

DETAILED DESCRIPTION

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

In the present disclosure, "PCC" refers to any client application requesting a path computation to be performed by a PCE.

In the present disclosure, "PCE" refers to an entity (component, application, or network node) that is capable of computing a network path or route based on a network graph and applying computational constraints.

In the present disclosure, "PCEP Peer" refers to any element involved in a PCEP session (i.e., a PCC or a PCE).

In the present disclosure, "MDSC" refers to a control entity that oversees the specific aspects of the different domains and builds a single abstracted E2E network topology to coordinate E2E path computation and path/service provisioning. In ACTN framework, the MDSC realizes this function by coordinating the per-domain PNCs in a hierarchy of controllers.

In the present disclosure, "PNC" refers to a Physical Network Controller that is responsible for controlling devices or NEs under its direct control. Its functions can be implemented as part of an SDN domain controller, a Network Management System (NMS), an Element Management System (EMS), an active PCE-based controller or any other means to dynamically control a set of nodes.

In the present disclosure, "RSVP" refers to a resource reservation setup protocol designed for an integrated services Internet. It provides receiver-initiated setup of resource reservations for multicast or unicast data flows, with good scaling and robustness properties.

In the present disclosure, "ASSOCIATION group" refers to a generic mechanism to create an association of LSPs.

In the present disclosure, "ASSOCIATION object" refers to an object used to associate LSPs with each other.

In the present disclosure, "PCInitiate" is a PCEP message sent by a PCE to a PCC to trigger LSP.

In the present disclosure, "PCUpd" is a PCEP message sent by a PCE to a PCC to update attributes of an LSP. The PCUpd message can carry more than one LSP Update Request.

In the present disclosure, "PCRpt" is a PCEP message sent by a PCC to a PCE to report the status of one or more LSPs.

Communication Methods, apparatuses and a communication system for sharing network resources in a communications network are disclosed. While aspects are described for mechanisms that would enable a PCE to notify the PCCs about shared resources of independent label switch paths to avoid path computation failures or duplicate allocation of resources during common links for new LSP's created during an update of E2E LSP, the present disclosure may be implemented in any number of different computing systems, environments, and/or configurations, the embodiments are described in the context of the following exemplary systems, devices/nodes/apparatus, and methods.

The present disclosure discloses a mechanism for a PCE to notify a PCC about shared resource of two independent LSP's. It specifically focuses on enabling a PCE to send an association object with new association type as "Resource Sharing" to PCC so as to allow sharing of resources of two independent LSP's where either the ingress, or the egress, or both ingress and egress are different among the LSP's. Notably the MDSC is similar to a PCE and the PNC can be both PCE and PCC. With respect to MDSC, PNC is PCC, but with respect to network devices PNC is PCE.

Significantly, a PCE has access to the information carried by a network's interior gateway protocol (IGP) and also the set of currently active paths with their reserved resources for path computations. The PCE is also capable of computing constrained paths while considering individual LSPs and their interactions. The active PCE functionality allows a PCE to reroute an existing LSP or make changes to the attributes of an existing LSP, or a PCC to delegate control of specific LSPs to a new PCE.

In particular, the present disclosure provides a PCEP extension for associating LSP's whose ingress, or egress, or both ingress and egress are different for resource sharing to avoid path computation failures or duplicate allocations during common links for new LSP's created during an update of E2E LSP. The PCC employs RSVP for LSP signalling, PCC forwards path message information along with association object to the RSVP for LSP signalling. The RSVP uses the association object in its reservation message for LSP setup.

The extensions of PCE association group object and messages to support shared bandwidth in hierarchical PCE are as follows.

Figure 3:
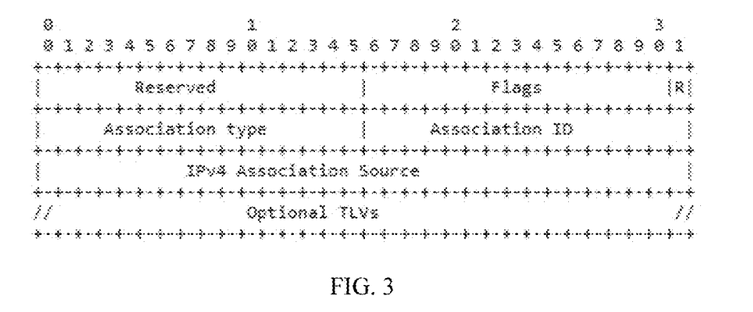
FIG. 3 illustrates an Internet Protocol version 4 (IPv4) ASSOCIATION Object format, in accordance with an embodiment of the present subject matter.
Figure 4:
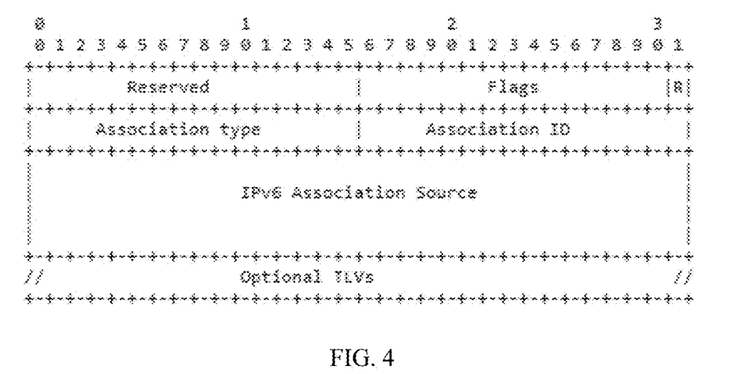
FIG. 4 illustrates an Internet Protocol version 6 (IPv6) ASSOCIATION Object format, in accordance with an embodiment of the present subject matter.

Existing ASSOCIATION Object. An association group is a generic mechanism to create an association of LSPs. This grouping is subsequently used to define associations between sets of LSPs or between a set of LSPs and a set of attributes. FIG. 3 illustrates an IPv4 ASSOCIATION Object format while FIG. 4 illustrates an IPv6 ASSOCIATION Object format. The ASSOCIATION Object-Type is 2 for IPv6.

Significantly, the Reserved (2-byte) must be set to 0 and ignored upon receipt. The currently defined Flags (2-byte) are R (Removal—1 bit) which when set indicates that the requesting PCE peer requires removal of an LSP from the association group. The Association type (2-byte) is an association type, for example, protection while the Association identifies (ID) (2-byte) is the identifier of the association group. When combined with Type and Association Source, this value uniquely identifies an association group. The value 0xffff and 0x0 are reserved. The value 0xffff is used to indicate all association groups.

The Association Source (4 or 16 bytes) is an IPv4 or IPv6 address. This may be the Internet Protocol (IP) address of the PCEP speaker that created a dynamic association, an operator configured IP address, or an IP address selected as per the local policy. The value such as 0.0.0.0 or ::/128 are acceptable. The optional type-length-values (TLVs) follow the conventional PCEP TLV format. The ASSOCIATION Object is optional and may be carried in the PCUpd, PCRpt and PCInitiate messages.

Significantly, when an LSP is delegated to a stateful PCE, the stateful PCE initiates a new association group for this LSP, or associate it with one or more existing association groups. This is done by including the ASSOCIATION Object in a PCUpd message. The PCUpd message (also referred to as a Path Computation LSP Update Request message) is a PCEP message sent by a PCE to a PCC to update attributes of an LSP. The PCUpd message carries more than one LSP Update Request.

The PCE initiating a new LSP, can include the association group information. This is done by including the ASSOCIATION Object in a PCInitiate message.

Figure 5A:
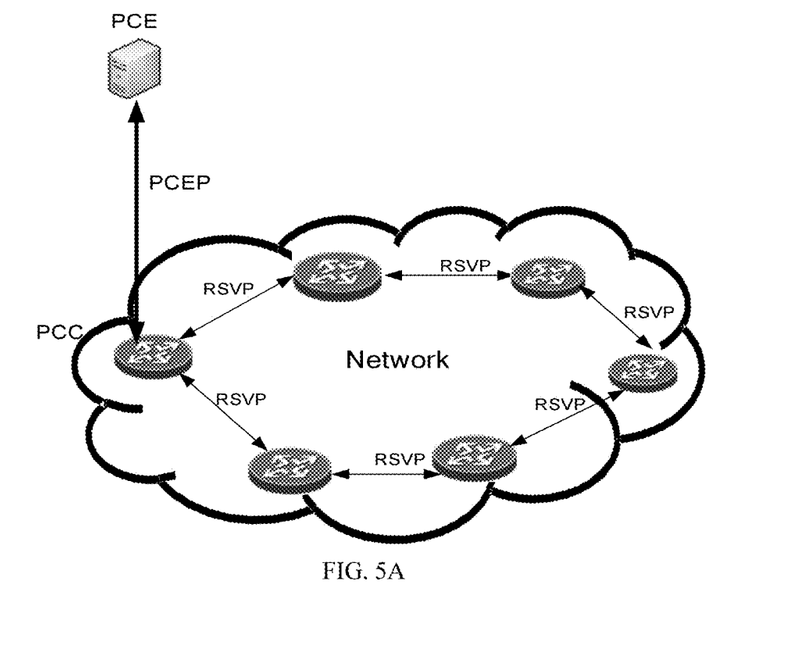
FIG. 5A illustrates resource sharing in Association Object, in accordance with an embodiment of the present subject matter.

(b) New Association type for resource sharing in Association Object. A new Association Type for Resource Sharing has to be defined in PCE association group. The PCE sends an update message with association object for old LSP first and then sends initiate request for new LSP with the same association ID of old LSP and association type as "Resource Sharing". The PCC will use RSVP for LSP signalling. The PCC is equipped to forward the path message information along with association object to RSVP for LSP signalling. The RSVP can thus, use the association object in its reservation message for LSP setup, as illustrated in FIG. 5A.

The present disclosure specifically focuses on the issue of resource sharing between two independent LSP's when either the ingress, or the egress, or both ingress and egress are different among the old and updated LSP's. This is to avoid failure or duplicate allocation of resources during path re-computation in common links, as shared resources are not considered by domain controllers for the new LSP's created during an update of an E2E LSP. To achieve the desired objectives, the present disclosure enables a PCE to send an update message with an association object for an old LSP first. Subsequently, it sends an initiate request for new LSP with same the association ID of old LSP and association type as "Resource Sharing" thereby ensuring that the two independent LSP's with either ingress or egress or both being different among the LSP's share their resources.

Figure 9:
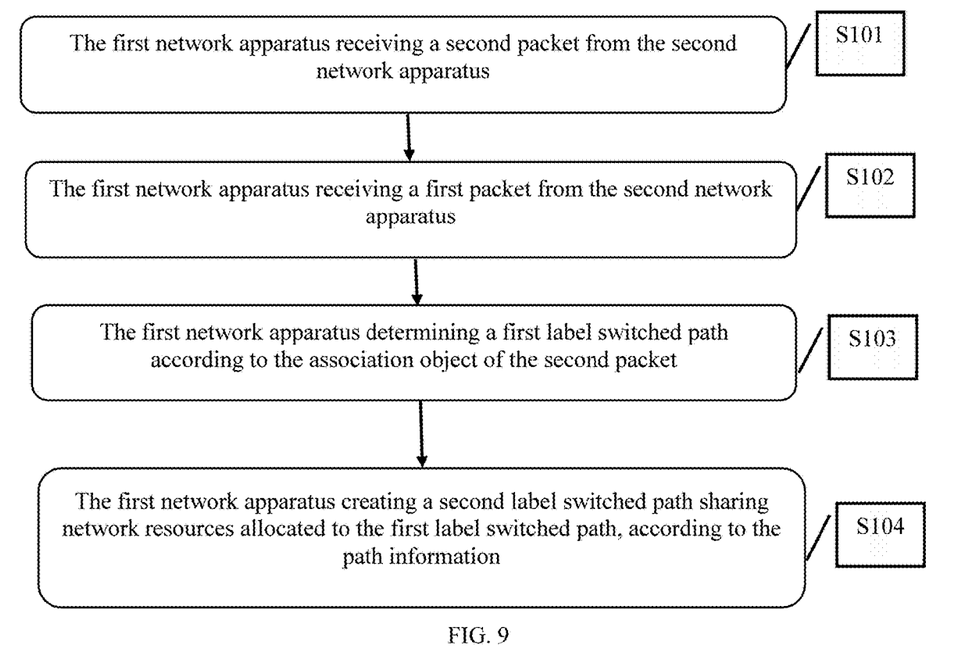
FIG. 9 illustrates a flowchart of a communication method performed by a PNC, in accordance with an embodiment of the present subject matter.

FIG. 9 illustrates a flowchart of the communications method performed by the first network apparatus for sharing network resources in a communications network. The method comprises the following steps.

Step S101, the first network apparatus receiving a second packet from the second network apparatus.

Step S102, the first network apparatus receiving a first packet from the second network apparatus.

Step S103, the first network apparatus determining a first label switched path according to the association object of the second packet.

Step S104, the first network apparatus creating a second label switched path sharing network resources allocated to the first label switched path, according to the path information.

Figure 10:
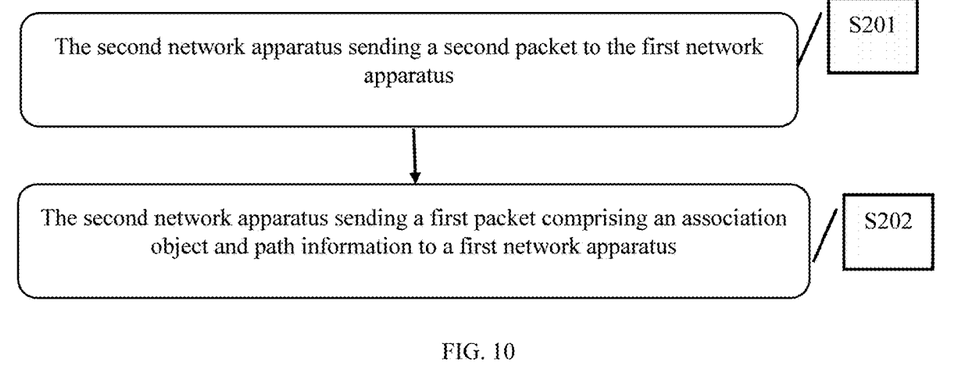
FIG. 10 illustrates a flowchart of a communication method performed by a MDSC, in accordance with an embodiment of the present subject matter.

FIG. 10 illustrates a flowchart of the communication method performed by the second network apparatus for sharing network resources in a communications network. The method comprises the following steps.

Step S201, the second network apparatus sending a second packet to the first network apparatus.

Step 202, the second network apparatus sending a first packet comprising an association object and path information to a first network apparatus.

Figure 6A:
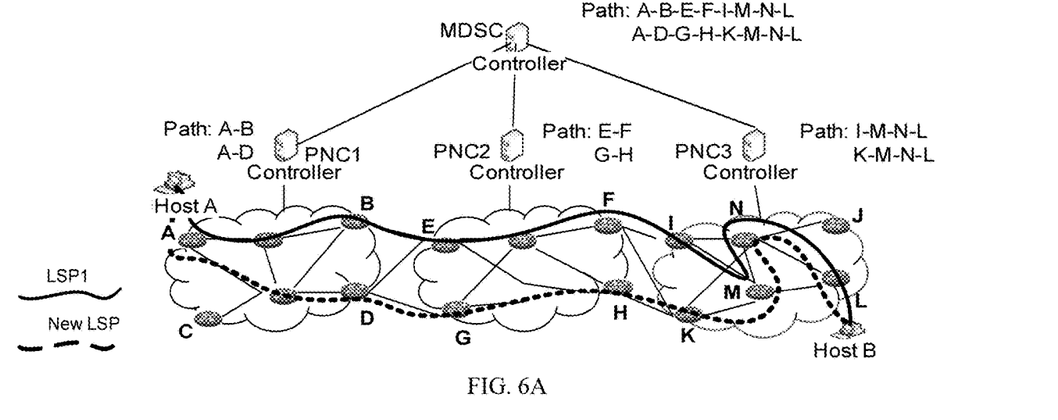
FIG. 6A illustrates a block diagram of the system, in accordance with an embodiment of the present subject matter.
Figure 6B:
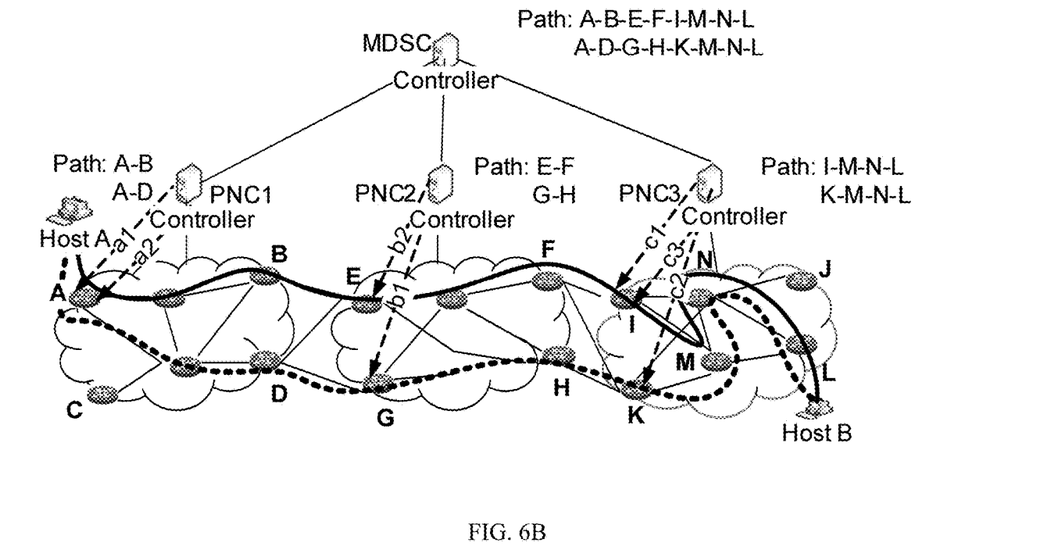
FIG. 6B illustrate a block diagram of the system, in accordance with an embodiment of the present subject matter.

The first network apparatus is a PNC while second network apparatus is a MDSC. Notably, the first network apparatus creating a second label switched path according to the path information involves the PNC asking an ingress node, such as device K of FIG. 6, to setup the LSP using RSVP signalling using the path information. The PNC sends the association object to ingress node too. The ingress node creates a LSP according to the path information, and initiates LSP association by inserting appropriate ASSOCIATION objects in the Path message of LSPs that are to be associated. The first label switched path and the second label switched path have different ingress nodes or egress nodes, i.e., different ingress nodes, different egress nodes, different ingress and different egress.

The downstream nodes, such as device M of FIG. 6, correlates LSPs based on received ASSOCIATION objects. The multiple types of LSP association are supported by the ASSOCIATION object, and downstream correlation is made based on the type. The type is "resource sharing". The ASSOCIATION object using in RSVP, hereinafter referred to as an R-object, is a little different from the ASSOCIATION object of PCEP, hereinafter referred to as a P-object.

Figure 5B:
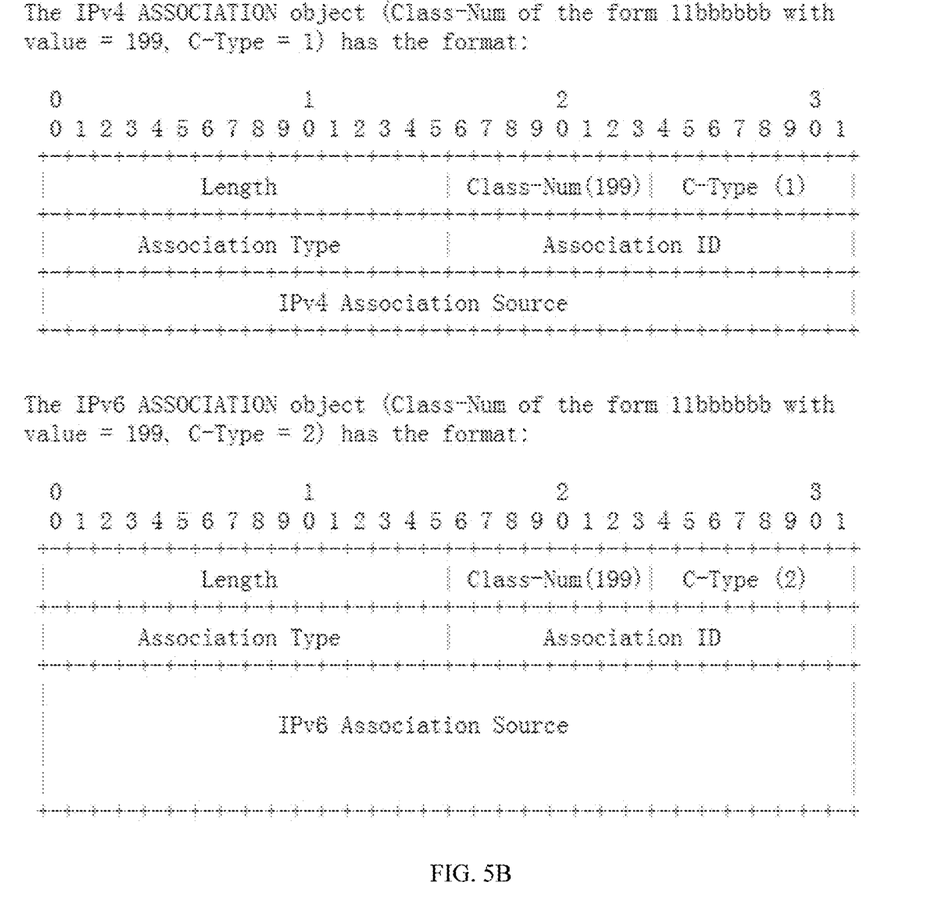
FIG. 5B illustrates the ASSOCIATION object formats for IPv4 and IPv6, in accordance with an embodiment of the present subject matter.

The original figure of the R-object format has been illustrated in FIG. 5B. The ASSOCIATION object is used to associate LSPs with each other. In E2E LSP recovery, the association must only identify LSPs that support the same Tunnel ID as well as the same tunnel sender address and tunnel endpoint address. For this Association Type, Association Source, and Association ID fields of the object uniquely identify the association. Provisions are present for the object to ensure compatibility with non-supporting nodes as well. Notably, the Association Type is 16 bits and indicates the type of association being identified. The Association ID is 16 bits. A value assigned by the LSP head-end. When combined with the Association Type and Association Source, this value uniquely identifies an association. The Association Source is 4 or 16 byte and an IPv4 or IPv6 address, respectively, that is associated to the node that originated the association.

The first packet is a PCInitiate message and comprises association object and path information. The path information refers to EXPLICIT_ROUTE object (ERO) which is included in a PCInitiate message. The ERO specifies a path. The PCC creates a new LSP according to the ERO. The PCInitiate message includes the association object and the ERO.

The second packet is a PCUpd message or a PCRpt message from the second network apparatus and comprises an association object and an identifier indicating the first label switched path. The association object comprises an association type indicating resource sharing. The identifier refers to PCEP-specific LSP (PLSP)-ID and each LSP has a unique PLSP-ID. The PCE includes a PLSP-ID in an update message to indicate a LSP to be updated. After receiving the update message which comprises association object and PLSP-ID, the PCC may maintain the relationship between association ID and PLSP-ID. So PCC can obtain PLSP-ID according to the relationship and the association object in the Initiate message. The second packet indicates that the first label switched path is associated with the association object.

The second label switched path shares network resources allocated to the first label switched path with the first label switched path. The new LSP shares network resources with the old LSP when the new LSP is created. Once the ingress node of the new LSP receives a Resv message for the new LSP, the traffic of the old LSP may be transited to the new LSP, and subsequently the old LSP may be torn down.

FIG. 6A and FIG. 6B illustrate examples where a master controller or the MDSC computes a path between hosts A to L. In particular, they illustrate a system for routing data packets in a communications network. This system comprises at least one first network apparatus (PNC1, PNC2, PNC3) that is adaptively configured to route data packets among plurality of network elements (A-L) and a second network apparatus (MDSC) that is adaptively configured to control a plurality of network apparatuses. The first network apparatus (PNC1, PNC2, PNC3) controls a plurality of network elements (A-D, E-H, I-L). Notably, the domain controllers or PNC's i.e., PNC1, PNC2 and PNC 3, setup the paths A-B, E-F and I-L, respectively. The path A-B-E-F-I-M-N-L is the LSP1 or old LSP. In FIG. 6B illustrates that PNC1 issues initiate message to create new LSP A-D (a1) and issues update message to delete old LSP A-B (a2) to host A. PNC2 issues PNC2 issues initiate message to create new LSP G-H (b1) to host G and issues update message to delete old LSP E-F (b2) to host E. PNC3 issues initiate message to add association object to old LSP I-L (c1) to host I, issues initiate message to create new LSP with association object K-L (c2) to host K, and issues update message to delete old LSP I-L (c3) to host I.

During global optimization/path update, the master controller re-computes the E2E path between A to L, based on the new constraints. This is similar to MBB for LSP1 in the master controller. To update this LSP1, the master controller breaks this E2E LSP to domain specific Update/Delete/Create domain specific LSP, for the new LSP. Significantly, for the master controller, this is an MBB for LSP1.

For domain controller PNC1, the re-computation of E2E path results in creating new LSP involving hosts A-D with a new association type as "Resource Sharing" and deleting the old LSP involving hosts A-B. In particular, the PNC1 sends a PCInitiate message with same association object and association type as "Resource Sharing".

For domain controller PNC2, the re-computation of E2E path also results in creating new LSP involving hosts G-H with new association type as "Resource Sharing" and deleting the old LSP involving hosts E-F. In particular, the PNC2 also sends a PCInitiate message with same association object and association type as "Resource Sharing".

For domain controller PNC3, the re-computation of E2E path results in creating new LSP involving hosts K-M-N-L with a new association type as Resource Sharing" and deleting the old LSP involving host I-L. The network resources such as bandwidth will be shared between the two LSP's.

Figure 7:
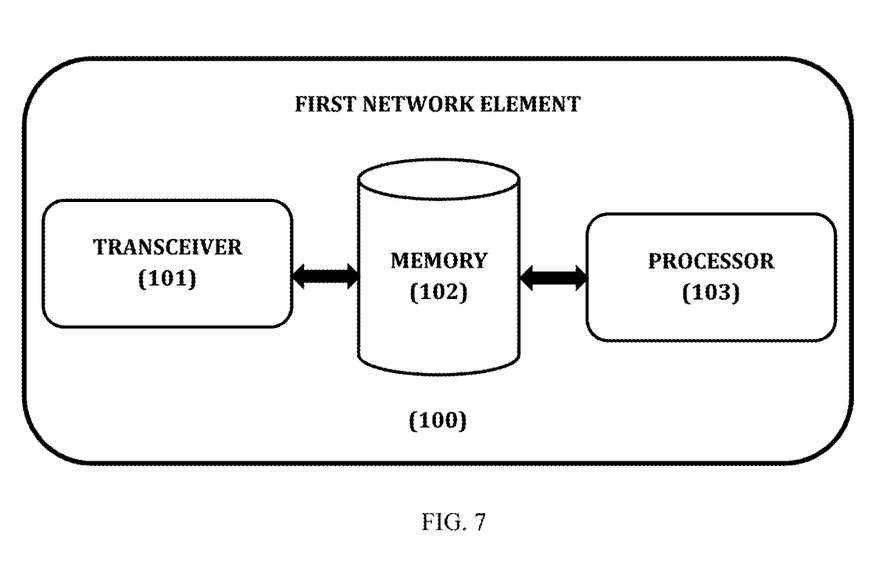
FIG. 7 illustrates a first network apparatus, in accordance with an embodiment of the present subject matter.

FIG. 7 illustrates the first network apparatus (100) which is a domain controller. The first network apparatus (100) comprises at least a transceiver unit (101) and a processing unit (103). There is also a memory unit (102). The transceiver unit (101) is configured to receive a first packet comprising an association object and path information. It is also configured to receive a second packet before receiving the first packet where the second packet comprises the association object and an identifier indicating the first label switched path. The second packet indicates that the first label switched path is associated with the association object. The processing unit (103) is configured to determine a first label switched path according to the association object and create a second label switched path according to the path information, where the second label switched path shares network resources allocated to the first label switched path with the first label switched path.

Figure 8:
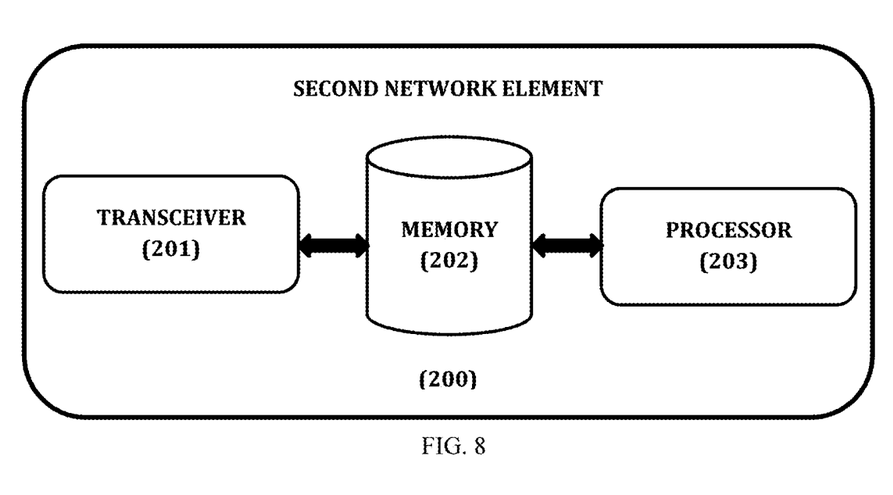
FIG. 8 illustrates a second network apparatus, in accordance with an embodiment of the present subject matter.

FIG. 8 illustrates the second network apparatus (200) which is a master controller. The second network apparatus (200) comprises at least a transceiver unit (201), a processing unit (203) and a memory unit (102). The transceiver unit (201) is configured to send a first packet comprising an association object and path information where the first packet instructs the first network apparatus (100) to determine a first label switched path according to the association object and create a second label switched path according to the path information. The second label switched path shares network resources allocated to the first label switched path with the first label switched path. The transceiver unit (201) is also configured to send a second packet before sending the first packet where the second packet comprises association object and identifier indicating the first label switched path. The second packet indicates that the first label switched path is associated with the association object.

Significantly, the second packet is a PCUpd message, or a PCRpt message or any similar message and the first packet is a PCInitiate message or any similar message. The first network apparatus creates label switched path segments between at least two of its network elements. The label switched path (A-B-E-F-I-M-N-L) comprises a plurality of label switched path segments such as the first label switched path segment (A-D, G-H, K-M, N-L), the second label switched path segment (A-B, E-F, I-M, N-L), etc. The resources allocated to the second label switched path segment (A-B) are allocated on shared basis to the first label switched path segment (A-D).

The advantage of the present disclosure is that it enables the domain controller to consider shared resource in case of E2E LSP setup in hierarchical PCE because the case of existing E2E LSP setup in hierarchical PCE, the domain controllers fail to a compute path when resources are not available or duplicate resource allocation happens.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present disclosure.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present disclosure essentially, or the part contributing to the other approach, or a part of the technical solutions may be implemented in a form of a software product. The computer software product is stored in a storage medium, and includes several instructions for instructing a computer node (which may be a personal computer, a server, or a network node) to perform all or a part of the steps of the methods described in the embodiment of the present disclosure. The foregoing storage medium includes any medium that can store program code, such as a Universal Serial Bus (USB) flash drive, a removable hard disk, a read-only memory (ROM), a random access memory (RAM), a magnetic disk, or an optical disc.

Devices that are in communication with each other need not be in continuous communication with each other, unless expressly specified otherwise. In addition, devices that are in communication with each other may communicate directly or indirectly through one or more intermediaries.

The invention claimed is:

1. A sharing network resources communication method implemented by a first network apparatus, wherein the sharing network resources communication method comprises:
   receiving a first path computation element protocol (PCEP) message from a second network apparatus, wherein the first PCEP message comprises an association object and path information, and wherein the association object comprises an association type indicating resource sharing and an association ID identifying an association group;
   determining a first label switched path (LSP) according to the association ID in the association object; and
   creating a second LSP according to the path information, wherein the first LSP and the second LSP have different ingress nodes or egress nodes, wherein the network resources are allocated to the first LSP, and wherein the second LSP shares the network resources allocated to the first LSP.

2. The sharing network resources communication method of claim 1, wherein prior to receiving the first PCEP message, the sharing network resources communication method further comprises receiving a second PCEP message from the second network apparatus, wherein the second PCEP message comprises an association object comprising the association ID and an identifier indicating the first LSP, and wherein the second PCEP message indicates the first LSP is associated with the association object.

3. The sharing network resources communication method of claim 2, wherein the second PCEP message is a path computation update message.

4. The sharing network resources communication method of claim 2, wherein the second PCEP message is a path computation report message.

5. The sharing network resources communication method of claim 1, wherein the first LSP and the second LSP have different ingress nodes and egress nodes.

6. The sharing network resources communication method of claim 1, wherein the first PCEP message is a path computation initiate message.

7. A first network apparatus for sharing network resources, comprising:
   a processor; and
   a memory coupled to the processor and storing instructions that, when executed by the processor, cause the first network apparatus to be configured to:
      receive, from a second network apparatus, a first path computation element protocol (PCEP) message comprising an association object and path information, wherein the association object comprises an association type indicating resource sharing and an association ID being an identifier of an association group;
      determine a first label switched path (LSP) according to the association ID in the association object; and
      create a second LSP according to the path information, wherein the first LSP and the second LSP have different ingress nodes or egress nodes, wherein the network resources are allocated to the first LSP, and wherein the second LSP shares the network resources allocated to the first LSP.

8. The first network apparatus of claim 7, wherein before receiving the first PCEP message, the instructions further cause the first network apparatus to be configured to receive a second PCEP message, wherein the second PCEP message comprises an association object comprising the association ID and an identifier indicating the first LSP, and wherein the second PCEP message indicates that the first LSP is associated with the association object.

9. The first network apparatus of claim 8, wherein the second PCEP message is a path computation update message.

10. The first network apparatus of claim 8, wherein the second PCEP message is a path computation report message.

11. The first network apparatus of claim 8, wherein the instructions further cause the first network apparatus to be configured to maintain a relationship between the association ID and the identifier indicating the first LSP.

12. The first network apparatus of claim 11, wherein the instructions further cause the first network apparatus to be configured to determine the first label switched path according to the relationship and the association ID in the first PCEP message.

13. The first network apparatus of claim 7, wherein the first LSP and the second LSP have different ingress nodes and egress nodes.

14. The first network apparatus of claim 7, wherein the first PCEP message is a path computation initiate message.

15. The first network apparatus of claim 7, wherein the first network apparatus is a domain controller having the control to a first domain, and wherein the second network apparatus is a super controller which has a global view of multiple domains comprising the first domain.

16. The first network apparatus of claim 7, wherein the first network apparatus is used as a path computation client (PCC), and wherein the second network apparatus is used as a path computation element (PCE).

17. The first network apparatus of claim 7, wherein the first network apparatus is physical network controller (PNC), and wherein the second network apparatus is a multi-domain service coordinator (MDSC).

18. A second network apparatus for sharing network resources, comprising:
   a processor; and
   a memory coupled to the processor and storing instructions that, when executed by the processor, cause the second network apparatus to be configured to send a first path computation element protocol (PCEP) message comprising an association object and path information to a first network apparatus, wherein the association object comprises an association type indicating resource sharing and an association ID identifying an association group, wherein the resource sharing indicates that the network resources are shared by two independent label switch paths (LSPs) that are associated with each other by the association object wherein the first PCEP message instructs the first network apparatus to determine a first LSP according to the association ID in the association object and to create a second LSP according to the path information, wherein the first LSP and the second LSP have different ingress nodes or egress nodes, wherein the network resources are allocated to the first LSP, and wherein the second LSP shares the network resources allocated to the first LSP.

19. The second network apparatus of claim 18, wherein before sending the first PCEP message, the instructions further cause the second network apparatus to be configured to send a second PCEP message comprising an association object comprising the association ID and an identifier indicating the first LSP, and wherein the second PCEP message indicates that the first LSP is associated with the association object.

20. The second network apparatus of claim 19, wherein the second PCEP message is a path computation update message.

21. The second network apparatus of claim 19, wherein the second PCEP message is a path computation report message.

22. The second network apparatus of claim 18, wherein the first LSP and the second LSP have different ingress nodes and egress nodes.

23. The second network apparatus of claim 18, wherein the first PCEP message is a path computation initiate message.

24. The second network apparatus of claim 18, wherein the first network apparatus is a domain controller having the control to a first domain, and wherein the second network apparatus is a super controller which has a global view of multiple domains comprising the first domain.

25. The second network apparatus of claim 18, wherein the first network apparatus is physical network controller (PNC), and wherein the second network apparatus is a multi-domain service coordinator (MDSC).

26. A communication system, comprising:
a first network apparatus configured to:
receive a first path computation element protocol (PCEP) message from a second network apparatus, wherein the first PCEP message comprises an association object and path information, and wherein the association object comprises an association type indicating resource sharing and an association ID identifying an association group;
determine a first LSP according to the association ID in the association object; and
create a second LSP according to the path information, wherein the first LSP and the second LSP have different ingress nodes or egress nodes, wherein the network resources are allocated to the first LSP, and wherein the second LSP shares the network resources allocated to the first LSP; and
the second network apparatus configured to send the first PCEP message.

27. The communication system of claim 26, wherein the second network apparatus is further configured to before sending the first PCEP message, send a second PCEP message comprising an association object comprising the association ID and an identifier indicating the first LSP, and wherein the second PCEP message indicates that the first LSP is associated with the association object.

* * * * *